United States Patent
Colombo

(10) Patent No.: US 6,832,880 B2
(45) Date of Patent: Dec. 21, 2004

(54) OPERATING HEAD FOR AUTOMATIC MACHINE TOOLS, WITH PROJECTING INTERCHANGEABLE CHUCK UNIT

(75) Inventor: Mauro Colombo, Coldrerio Ticino (CH)

(73) Assignee: Tecniche Industriali S.r.l., Piacenza (IT)

( * ) Notice: Subject to any disclaimer, the term of this patent is extended or adjusted under 35 U.S.C. 154(b) by 29 days.

(21) Appl. No.: 09/823,162

(22) Filed: Mar. 30, 2001

(65) Prior Publication Data

US 2001/0046423 A1 Nov. 29, 2001

(30) Foreign Application Priority Data

May 25, 2000 (CH) .............................. 1057/00

(51) Int. Cl.[7] .............................. B23C 1/12; B23C 7/00
(52) U.S. Cl. ...................... 409/230; 409/201; 409/211; 409/144; 409/215; 74/813 L
(58) Field of Search .............................. 409/230, 216, 409/144, 201, 204, 211, 215, 224, 235; 408/236, 237; 901/41, 29; 74/813 L

(56) References Cited

U.S. PATENT DOCUMENTS

| | | | | |
|---|---|---|---|---|
| 3,760,652 A | * | 9/1973 | Joyard et al. | 74/813 L |
| 4,370,080 A | * | 1/1983 | Goode | 409/201 |
| 4,378,621 A | * | 4/1983 | Babel | 409/216 |
| 4,635,329 A | * | 1/1987 | Holy et al. | 409/216 |
| 4,652,190 A | * | 3/1987 | Corsi | 409/201 |
| 4,657,453 A | * | 4/1987 | Goulot et al. | 409/211 |
| 4,709,465 A | * | 12/1987 | Lewis et al. | 409/144 |
| 4,904,131 A | * | 2/1990 | Affaticati | 409/201 |
| 5,286,146 A | * | 2/1994 | Corsi | 409/201 |
| 5,322,494 A | * | 6/1994 | Holtey et al. | 409/230 |
| 5,385,436 A | * | 1/1995 | Corsi | 409/201 |
| 5,538,375 A | * | 7/1996 | Kwapisz | 409/201 |
| 5,678,291 A | * | 10/1997 | Braun | 409/202 |
| 5,823,722 A | * | 10/1998 | Takenaka | 409/230 |
| 6,514,183 B2 | * | 2/2003 | Hoppe | 409/230 |
| 2002/0107122 A1 | * | 8/2002 | Hoppe | 483/46 |

FOREIGN PATENT DOCUMENTS

JP          1-222809 A   *   9/1989

* cited by examiner

Primary Examiner—Erica Cadugan
(74) Attorney, Agent, or Firm—Notaro & Michalos P.C.

(57) ABSTRACT

An operating head for automatic machine tools of the type mounted on a structure for moving along a set of three Cartesian axes having a first support, fitted to the structure for rotation around a first axis, and a chuck unit fitted to the first support, wherein the chuck unit is interchangeable and projects from the first support, and is designed to allow angular positioning around a second axis orthogonal to the first axis. The first support includes a power transmission system for the chuck unit. The connection of the chuck unit to the first support permits changing from rough to finish work by simply replacing the chuck unit, rather than replacing the entire operating head.

9 Claims, 3 Drawing Sheets

Figure 1:
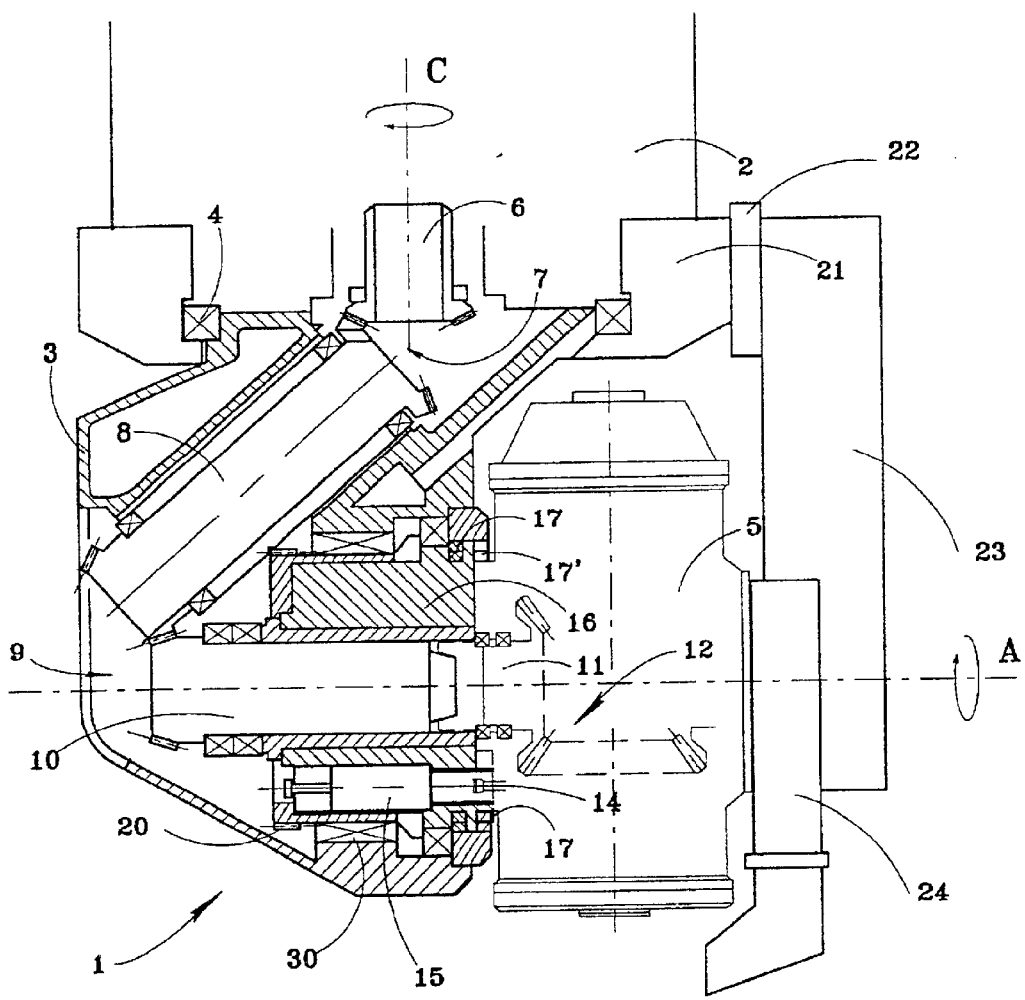

OPERATING HEAD FOR AUTOMATIC MACHINE TOOLS, WITH PROJECTING INTERCHANGEABLE CHUCK UNIT

This invention relates to an operating head for automatic machine tools with a projecting interchangeable chuck unit.

In particular, the head in accordance with the invention comprises a support that rotates around a first axis, which said support incorporates a power transmission system, and a kinematic mechanism for angular positioning of the chuck unit around a second axis, usually orthogonal to the axis of rotation of the support.

A plate integral with the chuck assembly is fitted with couplings designed for the connection of the said support.

The chuck assembly incorporates a power unit or motorised chuck suitable to perform high-speed finishing tasks.

This characteristic allows the operator to change over from roughing to finishing tasks without replacing the entire head (as is necessary with known equipment in which the chuck assembly is mounted on a fork support), merely by replacing the chuck unit, a much quicker and cheaper operation.

The automatic machine tools used to perform chip-forming tasks such as milling, contouring, etc., comprise a support that moves along three orthogonal axes on which an operating head with two degrees of freedom is mounted; the said operating head carries a tool unit consisting, for example, of a chuck or motorised chuck, on which the tool required for each task is mounted.

The structure and characteristics of these operating heads vary considerably, depending on whether the job in hand is a high-power task, performed with a roughing tool which rotates at a relatively low speed (max. 3000–5000 rpm) and removes large amounts of material, consequently discharging considerable reactive forces onto the structure, or a finishing/milling task, performed with a tool which rotates at high speed (up to 15,000–30,000 rpm).

The stresses to which the tool is subjected during these various types of work, which are discharged onto the structure and the upstream devices, require the use of chucks with different characteristics and dimensions, which means that different operating heads have to be manufactured.

In accordance with the present state of the art, when the operator wishes to change over from a high-power task to a finishing task, the entire operating head must be replaced, involving very high costs.

These factors lead to an increase in overall costs, due not only to the longer production times but also to the need to have two or more operating heads complete with the corresponding kinematic mechanisms, if not two or more separate machines used for roughing, finishing or other complementary tasks.

This problem is solved by the present invention, which relates to an operating head for automatic machine tools that includes an interchangeable chuck unit fitted to project from a support, which said unit can be replaced quickly and easily with a chuck of different characteristics.

For example, as the power transmission system and angular positioning devices of the chuck are built into the support to which the chuck unit is fitted, the operator can switch from a power chuck to a medium- or high-speed motorised finishing chuck very quickly, with no need to replace the entire head.

Figure 2:
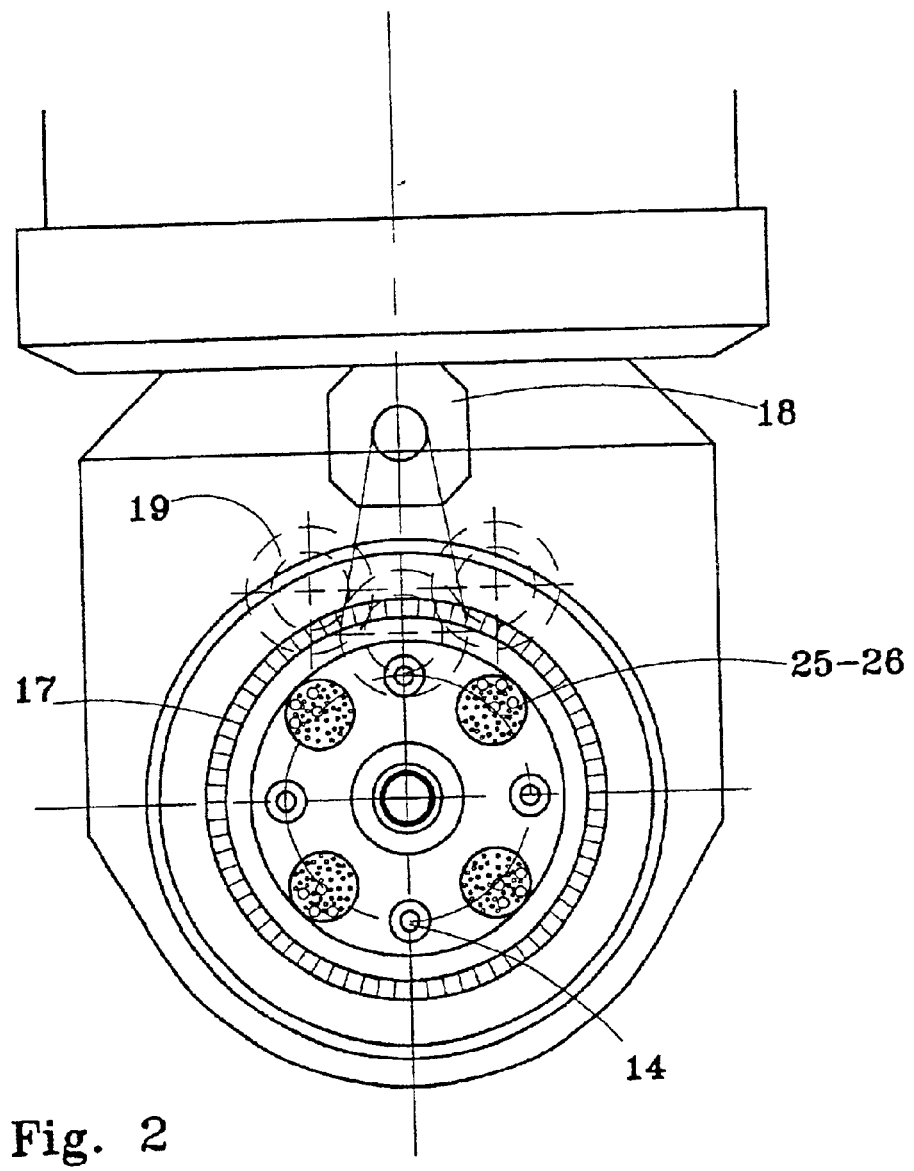
Figure 4:
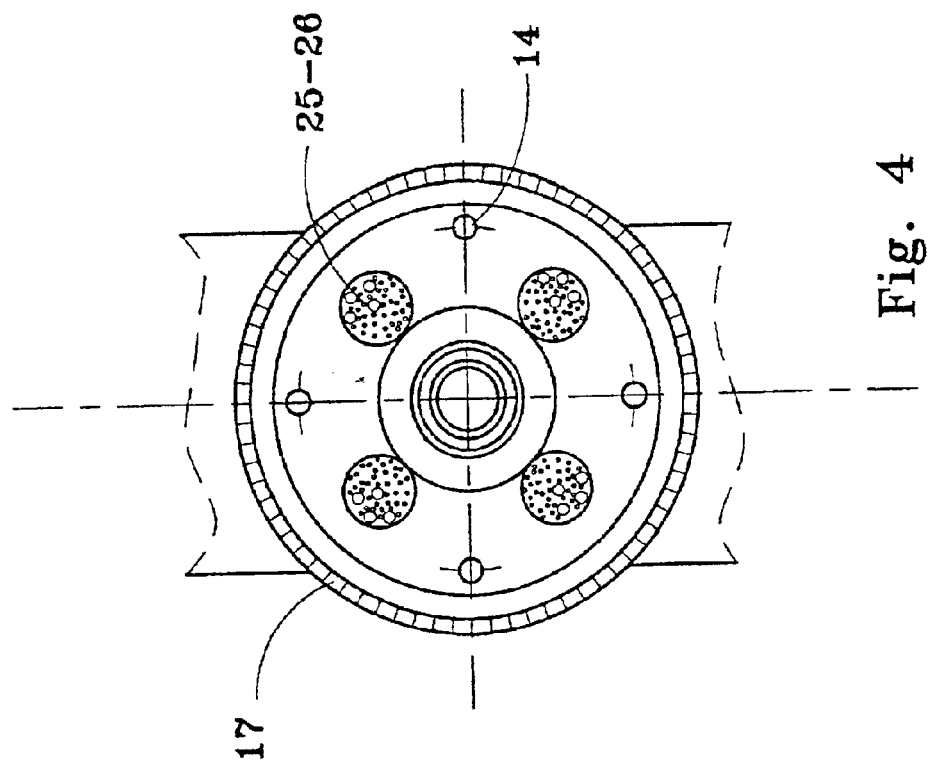
Figure 3:
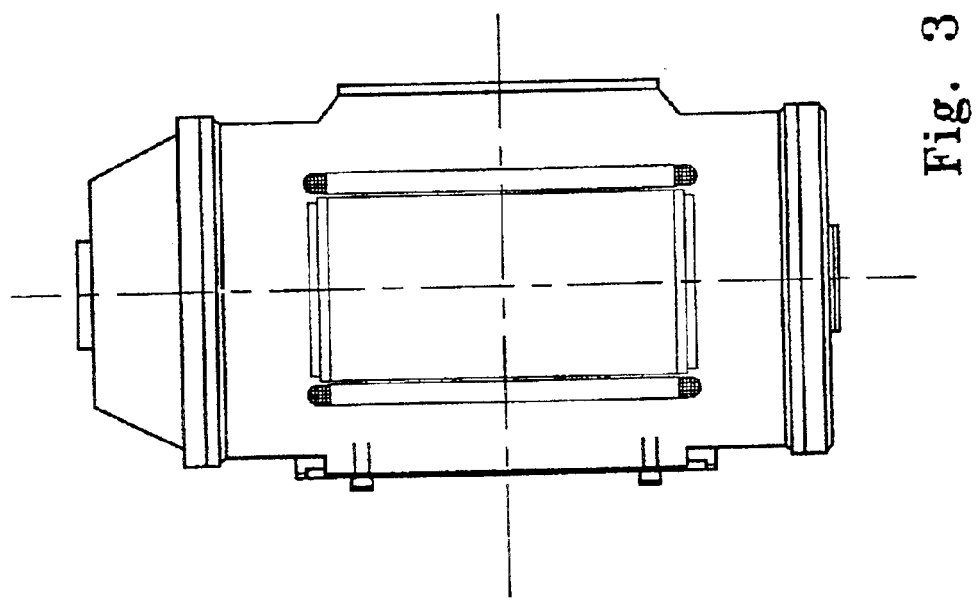

This invention will now be described in detail, by way of example but not of limitation, by reference to the annexed figures in which:

FIG. 1 shows a cross-section of the operating head in accordance with the invention FIG. 2 is a side view in partial cross-section of the operating head illustrated in FIG. 1, showing the arrangement of the couplings which lock the various chuck assemblies and the corresponding hydraulic and electrical power supplies which drive the automatic operating devices FIG. 3 schematically illustrates the interchangeable chuck unit, on which a motorised chuck is fitted FIG. 4 shows the plate fitted to the chuck unit for connection to the corresponding support.

In FIG. 1, no. 1 indicates an operating head in accordance with the invention, fitted to a sleeve 2 in such a way that it can rotate around a first axis identified as "C".

The head comprises a support 3, fitted to the sleeve via bearings 4, a chuck unit 5 being mounted on the said sleeve. Interchangeable chuck unit 5 may be a chuck, as illustrated in FIG. 1, or a motorised chuck, as illustrated in FIG. 3.

A shaft 6, connected to motor systems not illustrated in the figure, transmits motion via a bevel gear pair 7 to a second, inclined shaft 8, which, via another bevel gear pair 9, rotates a shaft 10.

A coupling of known type is fitted at the end of shaft 10 to transmit motion to shaft 11 of another bevel gear pair 12, fitted to the chuck unit and connected to power chuck 5.

The invention is not limited to the configuration illustrated, but also covers all equivalent solutions.

For example, in the case of power transmission systems, the invention will not be limited to the solution with an inclined shaft, but also extends to heads with other types of transmission, such as those with parallel and/or orthogonal shafts and the like.

The chuck unit is shaped in such a way as to form a coupling for connection to a body or support 16 with a set of pins or shanks 14, which are gripped by gripper elements 15 of known type fitted to support 16, to lock chuck 5.

Support 16 is fitted with toothing 17 which is engaged by corresponding toothing 17' present on the body of the chuck, and acts as a location plate for the correct positioning of the chuck.

Alternatively, in order to position the chuck unit precisely in relation to support 16, different devices can be fitted instead of the reference toothing, such as pins inserted into corresponding seatings in the adjacent piece or other systems.

A set of rapid couplings of known type 25 and 26 is fitted to the plate which constitutes the interface between the chuck unit and its support; the said couplings 25 and 26 are designed to connect the unit to electrical power supply devices and fluid supply devices, such as lubricants or coolants, respectively (FIG. 2).

A motor 18, schematically illustrated in FIG. 2, causes corresponding toothing 20 on support 16 to rotate via a cogwheel drive 19 with take-up system of known type.

Motor 18, controlled by a transducer, controls the angular positioning of the chuck unit around an axis identified as "A".

As will clearly appear from the description and the annexed drawings, chuck unit 5 can easily be removed, as it is only connected to the transmission devices via a coupling which requires the two parts to be brought into contact with one another and clamped with a simple, straight approach movement; it can therefore be detached with no need to remove any part of the head, merely by activating grippers 15 to release shanks or pins 14 and disconnect the electric and hydraulic couplings.

Chuck 5 can therefore be quickly and easily replaced with a different chuck unit which has the same coupling, such as a motorised chuck designed to perform high-speed finishing or milling tasks.

Subsequently, during operation, motor 18 will cause support 16 to rotate in order to position the chuck around axis "A", whereupon, in the case of machining performed with three machine axes (3+2 mode), support 16 will lock in the position reached.

For this purpose, a ring-shaped chamber shown as no. 30 in FIG. 1, with walls made of a deformable material, is fitted around support 16.

Chamber 30 is connected to means designed to convey pressurised fluid into the chamber so as to deform the walls, dilating them outwards in order to lock support 16 by friction.

Machining can be commenced by rotating the chuck tool via the transmission system constituted by shafts 6, 8, 10 and 11.

In the case of machining with 5 simultaneous axes, motor 18 will continuously vary the angle of the chuck unit under numerical control.

Chip-exhausting devices are also fitted, comprising a ring-shaped chamber 21 which surrounds the base of the head and contains one or more slits fitted with a rapid coupling 22 of known type for connection of an arm 23; another arm 24, which terminates close to the tool, is connected to the end of the said arm 23.

During machining, chips and/or dust are exhausted through ducts 24, 23 and 21 by devices of known type; if the chuck needs to be replaced, it is sufficient to disconnect ducts 23 and 24, which are removed together with the chuck and replaced by new ducts associated with the chuck to be fitted to the head, the said new ducts being connected via rapid coupling 22.

What is claimed is:

1. An operating head for automatic machine tools comprising:
    a first support adapted for rotation about a first axis and mounted on a structure movable in a set of three Cartesian axes;
    a second support rotatably mounted to the first support for rotation about a second axis orthogonal to the first axis;
    an interchangeable chuck unit, mounted to project from the second support;
    a power transmission system having a coupling connected to a drive connected to a chuck of said chuck unit;
    first means for controlling rotation of the second support about the second axis; and
    locking means for selectively locking the second support against rotation about the second axis;
    wherein said second support has a coupling means for detachably connecting to the chuck unit; said chuck unit being connectable to said power transmission system via a detachable coupling comprising parts brought into contact with each other and clamped with a straight approach movement.

2. An operating head according to claim 1, wherein the locking means comprises a chamber having walls made of a deformable material and fluid means for introducing a pressurized fluid into the chamber to deform the walls and frictionally lock the second support.

3. An operating head for automatic machine tools, comprising:
    a first support rotatably fitted on a structure, the first support rotatable around a first axis, the structure movable along a set of three Cartesian axes;
    a second support fitted to the first support, the second support being rotatable around a second axis;
    an interchangeable chuck unit projecting from the second support;
    first means for controlling the rotation of the second support around the second axis; and
    locking means for locking the second support in a rotated position, the locking means including a chamber having walls made of a deformable material fitted around the second support, the chamber connected to a fluid means for introducing a pressurized fluid into the chamber for deforming the chamber walls and locking the second support in the rotated position;
    wherein said second support has a detachable coupling means for connection to the chuck unit; said chuck unit being connectable to said power transmission system via a coupling comprising detachably cooperating parts.

4. An operating head according to claim 3, wherein the interchangeable chuck unit is one of a motorized chuck and a power chuck.

5. An operating head for an automatic machine tool having a structure movable along a set of three Cartesian axes, the operating head comprising:
    a first support rotatably fitted to the structure for rotation about a first axis;
    a chuck unit fitted to the first support, the chuck unit projecting from the first support and being rotatable to different angular positions around a second axis, the chuck unit being removable from the first support and having a chuck for holding a tool;
    the first support includes a power transmission system and means for connecting the power transmission system to the chuck unit; and
    a rotating support fitted to the first support, the chuck unit being mounted on the rotating support by means for detachably coupling, the rotating support including means for detachably coupling the power transmission system to the chuck unit, and the rotating support controllable by means for controlling rotation of the rotating support around the second axis.

6. An operating head according to claim 5, wherein the power transmission system comprises a drive having shafts and bevel gear pairs, connected on one side to a motor system of the structure, and having a coupling on the other side for connection to kinematic devices provided on the chuck unit.

7. An operating head according to claim 6, further comprising a ring-shaped chamber connected at one side to exhaust devices and on an opposite side to a duct terminating adjacent a coupling of a tool, the ring-shaped chamber fitted to the structure.

8. An operating head according to claim 7, wherein the duct is connected to the ring-shaped chamber by a coupling, the duct being integral with and rotatably connected to the chuck unit.

9. An operating head according to claim 5, further comprising a chamber having walls made of a deformable material fitted around the rotating support, the chamber being connected to fluid means for introducing a pressurized fluid into the chamber.

\* \* \* \* \*